Figure 1:
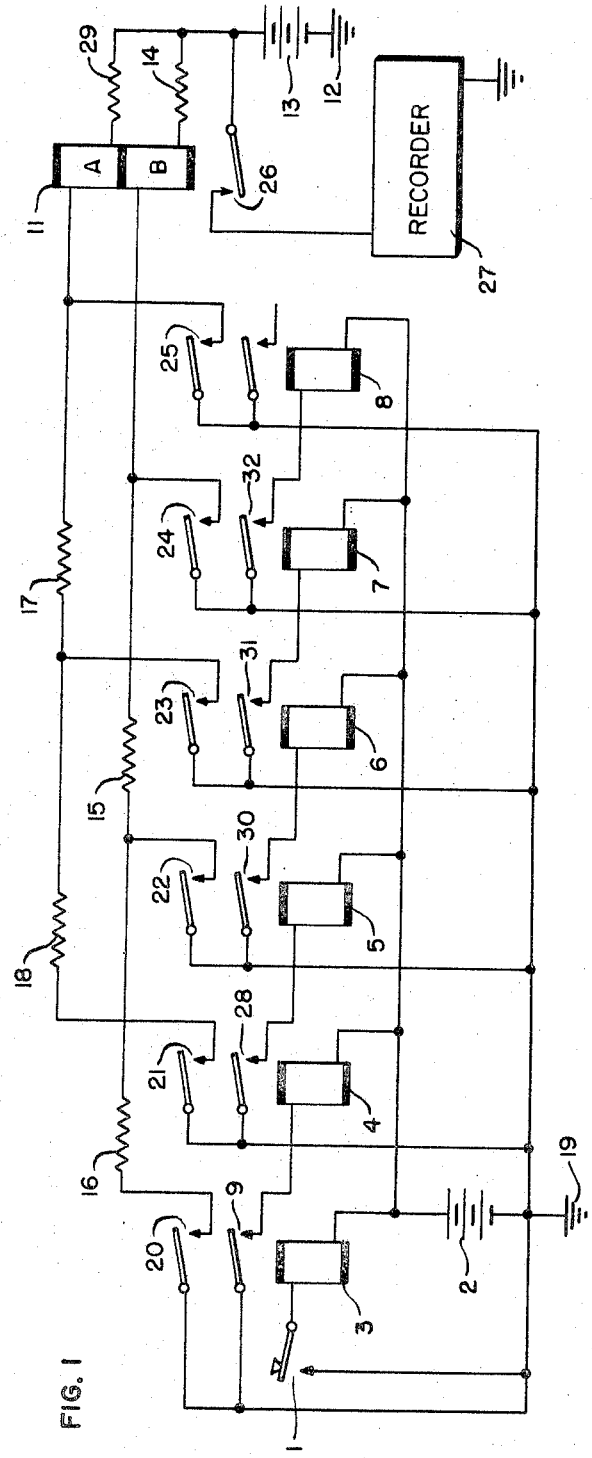

Sept. 5, 1967  R. C. CLARK  3,340,465
APPARATUS FOR DETERMINING ELAPSED TIME BETWEEN THE CLOSURE
OF CONTACTS OPERATED IN A NUMBERED SEQUENCE
Filed June 14, 1963

INVENTOR
ROBERT C. CLARK

BY
ATTORNEY

United States Patent Office

3,340,465
Patented Sept. 5, 1967

3,340,465
APPARATUS FOR DETERMINING ELAPSED TIME BETWEEN THE CLOSURE OF CONTACTS OPERATED IN A NUMBERED SEQUENCE
Robert C. Clark, Morton Grove, Ill., assignor to Teletype Corporation, Skokie, Ill., a corporation of Delaware
Filed June 14, 1963, Ser. No. 287,832
5 Claims. (Cl. 324—28)

This invention relates to electrical testing circuits and methods for operating them and more particularly to methods for alternately operating and releasing two-winding relays and to a relay-operating-time test circuit for measuring the elapsed time between closure of successive contacts of a series sequence.

It frequently is desirable to measure the time between the closure of successive contacts in chain circuits where the operation of one electrical instrumentality initiates the operation of a succeeding one.

It is an object of the present invention to measure the elapsed time between the operation of electrical components operating in sequence.

Another object of the invention is to provide apparatus for measuring and recording the time interval between the operation of a succession of relays operating in a predetermined sequence.

A still further object of the invention is to measure the interval between the closure of contacts operated in a relay chain.

Yet another object of the invention is to measure the time delay between the operation of contacts of relays wherein each relay, upon being operated, initiates the operation of a succeeding relay in a chain.

One further object of the invention is to provide a method of alternately operating and releasing a relay.

It is also an object of the invention to alternately energize and deenergize a relay having two opposing windings by successively increasing the current through the windings in successive increments.

Another object of the invention is to alternately operate and release a relay having two opposing windings by successively increasing the current through one winding and successively increasing the current through the other winding.

Still another object of the invention is to alternately close and open the contacts of a relay having two opposing windings by successively increasing the current through one winding and after each increase in the current in the one winding, increasing the current through the other winding.

In accordance with one embodiment of the invention apparatus is provided for measuring the elapsed time between closure of contacts of a chain of relays operated in a numbered sequence wherein the operation of one of the contacts associated with one relay energizes the coil of the succeeding relay in the sequence. This apparatus includes sets of series-connected resistors incorporated into two energization paths for the separate, opposing windings of a two-winding relay.

As the relays in the chain operate, a contact pair of each relay shunts one of the series-connected resistors, first in the even-numbered set and then in the odd-numbered set until the operation of the entire sequence of relays has been completed. This provides increasing increments of current first to one coil and then to the other opposing coil of the two-winding relay. This alternation of increased energizing current to the coils of the two-winding relay causes a contact pair operated by the two-winding relay to alternately make and break response to these alternate increases of current. The output from the contacts of the two-winding relay controls a recorder to produce a record showing when each relay in the sequence operated.

Figure 2:
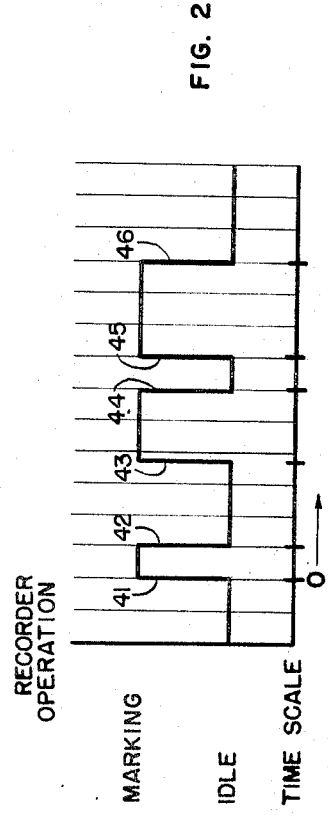

The present invention and its objects will be more fully understood from the following description when considered in conjunction with the accompanying drawings wherein:

FIG. 1 illustrates the preferred embodiment of the invention incorporating a two-winding relay as the switching means; and FIG. 2 is a chronological representation of the operation of a recorder. The transitions of the representation indicate when relays operated.

In the preferred embodiment of the invention as illustrated in FIG. 1, there is shown a chain of relays 3 through 8 wherein one of the contact pairs of each relay completes an energizing path for the coil of the next relay in the chain. The two strings of series-connected resistors 15 through 18 are arranged to be connected to ground by contacts 20 and 21 and then to be shunted by contacts 22 through 25. These operations cause the actuation of the two-winding relay 11 which has output contacts 26 that in turn control a recorder 27. This recorder may be of any conventional type, for example, the type which upon having current fed to it moves a marking element in one direction and upon cessation of such current moves the marking element in the opposite direction, to scribe lines on a record moving at a known constant rate of speed. A cathode ray oscilloscope is another example of a suitable recorder.

When energizing contacts 1 are closed to initiate operation of the relay chain, current passes from battery 2 through the coil of relay 3, contacts 1, and back to battery 2. The current through the coil of relay 3 is sufficient to cause contacts 9 and 20 to close. The closure of contact pair 9 provides an energization path for the coil of relay 4. The simultaneous closure of contact pair 20 provides an energization path for winding B of the two-winding relay 11 from ground 12, through battery 13, current limiting resistor 14, winding B of relay 11, resistors 15 and 16, contacts 20, and back to ground 19. Completion of this circuit permits sufficient current to flow through winding B of relay 11 to close its output contacts 26. The closure of contact pair 26 places the full potential of battery 13 upon the recorder 27 causing a record to be made of the time of contact closure.

The energization of relay 4 causes closure of contacts 21 and 28. Closure of contact pair 28 energizes the coil of relay 5 in a manner similar to the preceding relays, 3 and 4, in the chain of relays. The closure of contact pair 21 completes a circuit from ground 12 through battery 13, resistor 29, winding A of relay 11, resistors 17 and 18, contacts 21 and back to ground 19. Completion of this circuit causes sufficient current to flow in winding A of relay 11 to overcome the effect of the current flowing through winding B of relay 11. This causes the opening of contact pair 26 with a resultant indication by recorder 27.

The energization of relay 5 causes the closure of contacts 22 and 30 to complete a circuit through contacts 30 for energizing relay 6, and the closure of contact pair 22 shunts resistor 16 by providing an energizing path from ground 12, through battery 13, resistor 14, winding B of relay 11, resistor 15, and contacts 22 back to ground 19. This reduction of series resistance permits a sufficient increase in the current flowing through winding B of relay 11 to again cause the closure of contacts 26 which again is indicated by the recorder 27.

The energization of relay 6 closes contacts 23 and 31 to complete an energization path through contacts 31 for the coil of relay 7 and to complet a circiut path from ground 12 through battery 13, resistor 29, winding A of relay 11, resistor 17, contacts 23 and back to ground 19;

thus, shunting resistor 18. This permits sufficient additional current to flow through winding A of relay 11 to again overcome the effect of current flowing in winding B of relay 11. This results in the release of contact pair 26 which is again indicated by the recorder 27. Similarly the energization of relay 7 closes contacts 24 and 32 to complete an energization path through contacts 32 for relay coil 8 and the closure of contact pair 24 provides a circuit from ground 12 through battery 13, resistor 14, winding B of relay 11, contacts 24 to ground 19; thus, shunting resistor 15. This permits sufficient additional current to flow through winding B of relay 11 to again close contact pair 26 which is indicated by the recorder 27.

The energization of relay 8 closes contacts 25. This completes a path from ground 12, through battery 13, resistor 29, winding A of relay 11, through contacts 25 to ground 19; thus, shunting resistor 17 and thereby permitting sufficient additional current to flow through winding A of relay 11 to again cause the release of contacts 26 with a resultant indication by the recorder 27.

In FIG. 2 there is shown a chronological representation of the output of recorder 27. After the closure of contacts 1, resulting in the actuation of relay 3, contacts 20 close which results in the closure of contacts 26 that places the full potential of battery 13 upon the recorder 27. The closure of contacts 26, in supplying power to the recorder 27, will cause it to record such operation which will appear on the record medium as a transition from an idle marking condition to an energized marking condition.

Closure of contact pair 21 then causes contacts 26 to open; this causes the recorder to return from its energized to its idle marking condition as indicated by transition 42. The closure of contact pair 22 results in transition 43, and the closure of contact pair 23 results in transition 40. The successive closure of contacts 24 and 25 results in the energization and deenergization of the recorder as indicated by transitions 45 and 46.

It can be seen that the record shown in FIG. 2 is of no significance unless relay 11 operates or pulls up in exactly the same time that it takes to release; that is, relay 11 must have symmetrical operating characteristics. Each transition of FIG. 2 accurately represents the time at which each relay operated, and the distance between transitions indicates the time that elapsed between closure of contacts operated by the relays in the chain.

Although a sequence of only six relays is shown, the sequence of instrumentalities which can be tested is limited only by the sensitivity of the switch (exemplified by the two-winding relay) and the current capabilities of the components used in the circuit. In order to measure the interval from the start of the sequence (closing contact 1 in the preferred embodiment) until the operation of the first instrumentality, the first contact which connects or shunts the resistors must operate simultaneously with the start of the sequence.

A sequence of relays is shown operating a series of contacts 20 through 25, inclusive. The relative time of closure of these contacts is the thing being determined. The contacts may be operated by any suitable means including mechanical or electrical devices and is not limited to a chain of relays such as 3 through 8 inclusive operated by contacts 1, 9, 28, 30, 31, and 32 contained in the embodiment shown.

Although only one embodiment of the invention is shown in the drawings and described in the foregoing specification, it will be understood that the invention is not limited to the specific embodiment described, but is capable of modification and rearrangement and substitution of parts and elements without departing from the spirit of the invention.

What is claimed is:

1. An apparatus for determining the time that elapses between the closure of contact pairs operating in a numbered sequence comprising,
    (a) a plurality of contact pairs,
    (b) means for closing the contact pairs in a numbered sequence,
    (c) a switch having two operative conditions,
    (d) a recorder operable under control of said switch for recording the time of the occurrence of a transition from one operative condition of the switch to its other operative condition,
    (e) means operative in response to the closure of an odd-numbered one of said contact pairs operated in the numbered sequence of contact pairs for causing said switch to go from one operative condition to the other of its operative conditions,
    (f) means operative in response to the closure of an even-numbered one of said contact pairs operated after operation of the odd-numbered one of said contact pairs for causing said switch to go from the other of its operative conditions to its one operative condition, and
    (g) means operative in response to the closure of another odd-numbered one of said contact pairs after the operation of the even-numbered contact pairs for causing the switch to go from its one operative condition to its other operative condition.

2. Apparatus for determining the time that elapses between the operation of successive relays operating in a numbered sequence comprising:
    (a) a current source,
    (b) a relay having two windings arranged in an opposing relation,
    (c) a contact pair operated by said two-winding relay,
    (d) a recorder operable under control of the contact pair of said two-winding relay for recording the time of the occurrence of transitions from the actuated condition of the two-winding relay to its unactuated condition and from the unactuated condition of the two-winding relay to its actuated condition,
    (e) means operable in response to the operation of an odd-numbered relay in the numbered sequence for establishing a current from the current source through the first winding of the two-winding relay of sufficient magnitude to actuate the two-winding relay,
    (f) means operable in response to the operation of an even-numbered relay operated in the numbered sequence for establishing a current from the current source through the second winding of the two-winding relay of sufficient magnitude to cause the two-winding relay to assume its unactuated condition, and
    (g) means operable in response to the operation of another odd-numbered relay in the numbered sequence for increasing the current through the first winding of the two-winding relay sufficiently to actuate the two-winding relay.

3. An apparatus for determining the time that elapses between the operation of successive relays operating in a numbered sequence comprising:
    (a) a current source,
    (b) a relay having two windings arranged in opposed relation,
    (c) a contact pair operated by said two-winding relay,
    (d) a recorder operable under control of the contact pair operated by said two-winding relay for recording the time of the occurrence of a transition from the open condition of said contact pair to its closed condition and from the closed condition of said contact pair to its open condition,
    (e) a first energizing circuit including a plurality of series-connected resistors, the current source and the first winding of the two-winding relay for energizing the first winding,
    (f) means operable in response to the operation of odd-numbered relays operating in the sequence for shunting resistors of the first energizing circuit to establish current levels in the first winding of the two-winding relay of sufficient magnitude to cause it to assume its operated condition, (g) a second energizing circuit including a plurality of series-connected resistors, the current source and the second winding of the two-winding relay for energizing the second winding, and (h) means operable in response to the operation of even-numbered relays operating in the sequence for shunting resistors of the second energizing circuit to establish current levels in the second winding of the two-winding relay of sufficient magnitude to cause it to assume its released condition.

4. An apparatus for measuring the speed of operation of individual relays in a numbered sequence of relays, wherein the actuation of each relay energizes the next relay in the sequence, comprising:

(a) a current source, (b) a relay having two windings connected in opposed relation, (c) a contact pair operated by said two-winding relay, (d) a recorder operable under control of the contact pair operated by said two-winding relay for recording the time of the occurrence of a transition from closed condition of said contact pair to its open condition and from the open condition of said contact pair to its closed condition, (e) a first energizing circuit including a plurality of series-connected resistors, the current source and the first winding of the two-winding relay for energizing the first winding, (f) a first plurality of contact pairs operable in response to operation of the odd-numbered relays in the numbered sequence to shunt successive resistors of the series-connected resistors of the energizing circuit of the first winding of the two-winding relay, the shunting of each resistor permitting the flow of sufficient current through the first winding to cause the contact pair operated by said two-winding relay to go from its open condition to its closed condition, (g) a second energizing circuit including a plurality of series-connected resistors, the current source and the two-winding relay for energizing the second winding, and (h) a second plurality of contact pairs operable in response to the even- numbered relays in the numbered sequence to shunt successive resistors of the series-connected resistors of the energizing circuit of the second winding of the two-winding relay, the shunting of each resistor permitting the flow of sufficient current through the second winding of the two-winding relay to cause the contact pair operated by said two-winding relay to go from its closed condition to its open condition.

5. A circuit for alternately operating and releasing a relay having two opposing windings comprising:

a source of voltage and current;

a plurality of contact pairs operated in a numbered sequence;

a first plurality of resistors connected in series between the source and one winding of the relay completing a circuit for the one winding, the even-numbered contact pairs each associated with and connected in parallel with one of the first plurality of resistors in a one-to-one relationship for shunting each associated resistor upon closure of each contact pair to establish current levels in said one winding sufficient to operate the relay;

a second plurality of resistors connected in series between the source and the other winding of the relay completing a circuit for the other winding, the odd-numbered contact pairs each associated with and connected in parallel with one of the second plurality of resistors in a one-to-one relationship for shunting each associated resistor upon closure of each contact pair to establish current levels in the other winding sufficient to cause the operated relay to assume its unoperated condition, and means for closing the contact pairs in the numbered sequence thereby causing the relay to alternately assume its operated and unoperated conditions.

References Cited

UNITED STATES PATENTS

| | | | |
|---|---|---|---|
| 2,152,524 | 3/1939 | Miller | 317—155.5 |
| 2,468,308 | 4/1949 | Schwartz | 317—155.5 |
| 2,586,999 | 2/1952 | Schwartz | 324—28 |
| 2,611,808 | 9/1952 | Lawrence et al. | 317—155.5 |
| 2,877,405 | 3/1959 | Morton | 324—28 |
| 2,945,990 | 7/1960 | Hipple | 317—123 |
| 2,989,666 | 6/1961 | Brenner | 317—123 |
| 3,235,794 | 2/1966 | Henderson | 324—28 |

RUDOLPH V. ROLINEC, *Primary Examiner.*

W. L. CARLSON, *Examiner.*

E. L. STOLARUN, G. L. LETT, *Assistant Examiners.*